US006007320A

United States Patent [19]

Froese et al.

[11] Patent Number: 6,007,320

[45] Date of Patent: Dec. 28, 1999

[54] APPARATUS FOR PRODUCING WOOD-BASED PRESSED BOARD

[75] Inventors: Werner Froese, Krefeld; Michael Schöler, Rheurdt; Heinz Siebold, Krefeld; Hans-Dietrich Sitzler, Nettetal-Hinsbeck; Otto Voss, Krefeld; Lothar Sebastian, Bochum; Horst Weiss, Krefeld; Klaus Schürmann, Jüchen, all of Germany

[73] Assignee: G. Siempelkamp GmbH & Co., Krefeld, Germany

[21] Appl. No.: 08/799,993

[22] Filed: Feb. 13, 1997

[30] Foreign Application Priority Data

Feb. 14, 1996 [DE] Germany ............................ 196 05 296
Feb. 7, 1997 [DE] Germany ............................ 197 04 643

[51] Int. Cl.[6] ............................ B29C 43/48; B30B 5/06

[52] U.S. Cl. ............................ 425/143; 100/154; 425/371

[58] Field of Search ............................ 425/143, 371, 425/385; 100/93 RP, 154

[56] References Cited

U.S. PATENT DOCUMENTS

| | | | |
|---|---|---|---|
| 4,316,411 | 2/1982 | Keaton | 425/371 |
| 4,621,999 | 11/1986 | Gerhardt | 425/371 |
| 4,636,345 | 1/1987 | Jensen et al. | 425/371 |
| 5,160,411 | 11/1992 | Bold | 425/371 |
| 5,193,451 | 3/1993 | Sitlzer et al. | 425/371 |
| 5,433,905 | 7/1995 | Tisch | 425/371 |
| 5,454,304 | 10/1995 | Bielfeldt | 425/371 |
| 5,458,477 | 10/1995 | Kemerer et al. | 425/371 |
| 5,472,551 | 12/1995 | Bold | 425/371 |
| 5,520,530 | 5/1996 | Siempelkamp | 425/371 |
| 5,531,946 | 7/1996 | Bold | 425/371 |
| 5,762,980 | 6/1998 | Bielfeldt | 425/371 |
| 5,775,214 | 7/1998 | Bielfeldt et al. | 425/371 |

*Primary Examiner*—James P. Mackey
*Attorney, Agent, or Firm*—Herbert Dubno

[57] ABSTRACT

An apparatus for continuously produced pressed board has a structuring belt in the form of a metal wire screen which is fed with a respectively endless steel belt and the wood-based mat passing through a continuous press whose heated upper and lower press platens have the belts guided therealong via rollers displaceable along closed paths. The wire mesh configuration of the structuring belt is continuously impressed into the pressed board strand which is produced.

18 Claims, 4 Drawing Sheets

APPARATUS FOR PRODUCING WOOD-BASED PRESSED BOARD

FIELD OF THE INVENTION

Our present invention relates to an apparatus for producing wood-based pressed board, especially OSB (Oriented Strand Board) forming a wood-based mat which is pressed by a continuous press and is there hot pressed to form the board. In particular, the apparatus utilizes a continuous press of the type having an upper press part and a lower press part, each equipped with endless steel belts between which the mat passes and which are pressed against the upper and lower press parts via arrays of rollers which are circulated between the belts and the platens.

BACKGROUND OF THE INVENTION

Continuous presses of the aforedescribed type are widely used to press mats of wood chips, wood fibers, sawdust and the like, usually admixed with a thermally activatable or thermosetting binder, into a continuous strand which can be then subdivided into pressed board for use in a wide variety of structural and other applications. Depending on the pressing characteristics, the pressed board can have narrow thickness tolerances, high quality surfaces and surfaces which have a high degree of smoothness. Oriented Strand Board (OSB) has wood-based strands or chips with lengths ranging between 30 and 150 mm and width/length ratios of 1:5 to 1:10 and thicknesses of 0.25 to 1.5 mm. These elongated chips are deposited with a preferred orientation, usually in the longitudinal direction, and give rise to especially high strength and high quality boards.

It is common, with such systems, to press the mat after it has been pretreated with a heating fluid.

Substantially all of the boards described are exclusively smooth-surfaced members.

There are, however, also on the market wood-based pressed boards which have structured surfaces on one or both of its broad sides. Structured surfaces are advantageous because they increase the frictional coefficient of the surface, increase the ability of glue to anchor to the surface or otherwise provide advantages in the use of the product. The structuring can be in the form of alternating rises and depressions, also referred to as bumps and grooves. Up to now, continuous presses of the type described could not, to the best of our knowledge, be utilized effectively in the formation of structured surfaces for high quality pressed board.

To produce structured surfaces in wood-based pressed board, a cyclically operating system was used, usually involving platen presses and, most commonly, multilevel platen presses. The mats were charged into the various levels of the press upon a tray or other support and the press platens were provided with structuring complementary to that desired in the pressed board or a steel wire screen was placed upon the charging tray or interpositioned between the platen and the mat to impress the pattern of that screen in the board as it was pressed.

However, such cyclically operating systems present problems with respect to the charging and emptying of the press, problems with handling the pressed board and charge trays subsequent to the pressing operation and problems with removal of the wire mesh or sieve-like patterning members.

OBJECTS OF THE INVENTION

It is, therefore, the principal object of the present invention to provide an improved apparatus which can be utilized for the continuous production of pressed board with structured surfaces in a simple and economical manner and without the drawbacks previously described.

Another object of this invention is to so improve a continuous press of the type described that it can be utilized for the production of pressed board with structured surfaces.

SUMMARY OF THE INVENTION

These objects are attained, in accordance with the invention, by providing a continuous press of the type described with at least one endless structuring belt which is juxtaposed and runs along one of the steel press belts and is displaced synchronously with that press belt in the press gap between the press belt and the mat, the structuring belt being formed as a sieve or mesh from metal wire with the wire forming a pattern corresponding to the geometry of the structuring to be impressed in the belt. The mesh can be that of a woven sieve, knitted sieve or other mesh pattern.

According to a feature of the invention, the meshes of the structuring belt are hermetically sealed by a filler which, however, does not impede the embossing of the mesh pattern into the board. In a preferred embodiment of the invention, the filler provides a flat surface of the structuring belt where it lies against the pressing belt while a trough-like or recessed surface is turned toward the mat.

An apparatus for continuously producing pressed board then can comprise:

- a press having a heated upper press member and a heated lower press member defining between them a gap through which the wood-based mat passes continuously and in which said wood-based mat is compressed and heated to form a pressed board;
- an upper endless steel press belt and a lower endless steel press belt respectively guided along the upper and lower members to receive the wood-based mat between them and compress the wood-based mat between the belts;
- upper and lower sets of rollers respectively circulating along upper and lower paths extending between the upper endless steel press belt and the upper member and between the lower endless steel press belt and the lower member; and
- at least one endless structuring belt displaceable along a closed path extending between a respective one of the endless steel belts and the wood-based mat and moving synchronously with the one of the endless steel belts, the structuring belt being composed of wire in a screen pattern impressed in the board and forming a structuring thereof.

Utilizing such an apparatus, the method of making oriented strand press board can comprise the steps of:

(a) preheating a wood-based mat with a heating fluid selected from the group which consists of air and steam;

(b) pressing the preheated wood-based mat to form a board by passing the preheated wood-based mat through a press having a heated upper press member and a heated lower press member defining between them a gap through which the wood-based mat passes continuously and in which the wood-based mat is compressed and heated to form a pressed board, an upper endless steel press belt and a lower endless steel press belt respectively guided along the upper and lower members to receive the wood-based mat between them and compress the wood-based mat between the belts, and upper and lower sets of rollers respectively circulating along upper and lower paths extending between the upper endless steel press belt and the upper member and between the lower endless steel press belt and the lower member; and (c) structuring the board by passing at least one endless structuring belt displaceable along a closed path extending between a respective one of the endless steel belts and the wood-based mat and moving synchronously with the one of the endless steel belts, the structuring belt being composed of wire in a screen pattern impressed in the board and forming a structuring thereof.

The invention is based upon our discovery that, utilizing a continuous press of the type described an additional structuring belt can be readily incorporated with a wire mesh structure such that the wire thickness and the mesh width can be varied within wide ranges simply by replacing the belt so that different structuring patterns can be readily embossed in the press board.

This applies both for the upper press member as well as for the lower press member and thus the wood-based board can have structured surfaces imparted thereto on one or both sides.

Surprisingly, the integration of a sieve belt in an apparatus of the type initially described has no detrimental effect on the thermodynamics (heat transfer, temperature) and no detrimental effect on the pressing characteristics so that different press pressures, press pressure increases with time, press transmit times and press pressure drops can be utilized as previously and can be varied as previously with the same affects.

This is especially the case when the hermetic sealing filler in the sieve belt provides a flat surface of the latter against the corresponding press belt and a trough configuration is formed by the metal wires facing the mat.

This configuration also insures that the structuring belt will also have a long useful life.

The sieve belt and the juxtaposed steel pressed belt can be guided over different drums of which at least one of each can be driven. However, it has been found to be advantageous to guide the sieve belt and the corresponding press belt together over the same drum. The sieve belt should be maintained under an elastic pretension selected in accordance with the spring characteristic of the sieve belt so that slip between the sieve belt and the press belt is excluded.

In an apparatus in which there are independent drums for the two belts, the two drives of the two belts must be synchronized.

The filler for the sieve belt can be a temperature resistant synthetic resin or plastic which is received in the meshes of the sieve belt.

However, it can also be formed by a rubber composition which is vulcanized in place in the meshes. In a preferred embodiment of the invention, the filler can have admixed therewith a finely divided material which is thermally conductive and improves the thermal conductivity of the filler, for example, a metal powder.

At least one of the sieve belts and the press belt juxtaposed therewith can be composed of approximately the same material and can be widely in common through a heating tunnel so that different degrees of expansion of the two belts of the longitudinal and transverse techniques are largely avoided. When the belts have approximately the same material, they have essentially similar thermal conductivities and coefficients of thermal expansion. In this manner, moreover, relative movement between the press belt on the one hand and the structuring belt on the other in the press gap and during the press operation can be largely avoided. The similarity of materials also significantly reduces mechanical and thermodynamic loading on the belts and increases the useful life of both of them. It has been found to be advantageous to provide at the inlet region of the press, a heating unit which can equalize any possible remaining temperature differences between the press belt and the structuring belt. The heating unit also allows adjustment of the temperature of the structuring belt before it enters the press gap so that difficulties are not encountered as a result of the greater heat transfer to the mat from the structuring belt by contrast with the press belt. The heating unit can be a heating roller over which the structuring belt passes.

The heating of the belts and preheating of the mat can be set so that at the point at which the press mat, the structuring belt and the press belt come into mutual contact, the thermal expansion and thermal stresses are held to a minimum.

This latter can be accomplished, in accordance with the invention by providing separate temperature sensors for the structuring belt and the press belt, a computer responsive to the sensors and a control system operated by the computer and maintaining a temperature difference as a function of belt speed between the structuring belt and the press belt.

Utilizing the computer, the influence of the mesh type and the nature of the warp and weft wires and the like can be taken into consideration in the heating and the dimensional changes as a result of temperature changes can be compensated as well.

To control the travel of the structuring belt independently of the upper press belt, a control station with, for example, a drum around which the belt passes and having a controllable drive motor, for example, an electronically motor can be provided at the upstream or the downstream end of the return pass of the belts, or at both ends. It is an advantage in accordance with the invention that within the heating tunnel, the two belts are forced into contact with one another to effect heat transfer between them and heating of both of the belts in common by convection, conduction or radiation to bring them to the same temperature.

The invention is especially advantageous for producing wood-based boards and especially OSB from mats which have been preheated by treatment with hot air or steam. The hot air or steam can be passed through the mats which are formed by spreading the comminuted material on a surface. The fluid transversing the mat has a temperature which is higher than its dewpoint and the dewpoint difference of the air and steam which are combined for the heating. The amounts of the two fluids, the dewpoints themselves and the dewpoint differences can be so selected that a predetermined preheating temperature of the mat is established. Condensation of water vapor in the mat is acceptable. The moist heated mat can then be processed in accordance with the invention as described.

The preheating temperature, of course, will depend upon the processing temperature in the press and a measure of the achieved preheating temperature is the dewpoint temperature.

The preheating temperature corresponds at least to the dewpoint temperature but can be higher if an unsaturated fluid is used for the heating purposes. In any case, the preheating of the mat should be so carried out that the preheating will not cause any problems with subsequent placing of the glue, coated or nonglue coated particles of the mat.

Surprisingly, the preheating of mats for the formation of OSB gives rise to an especially clean structuring of the surface in accordance with the invention.

The fact that the meshes of the structuring belt are hermetically sealed is especially important in containing the moisture in the mat during the pressing and embossing operation.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
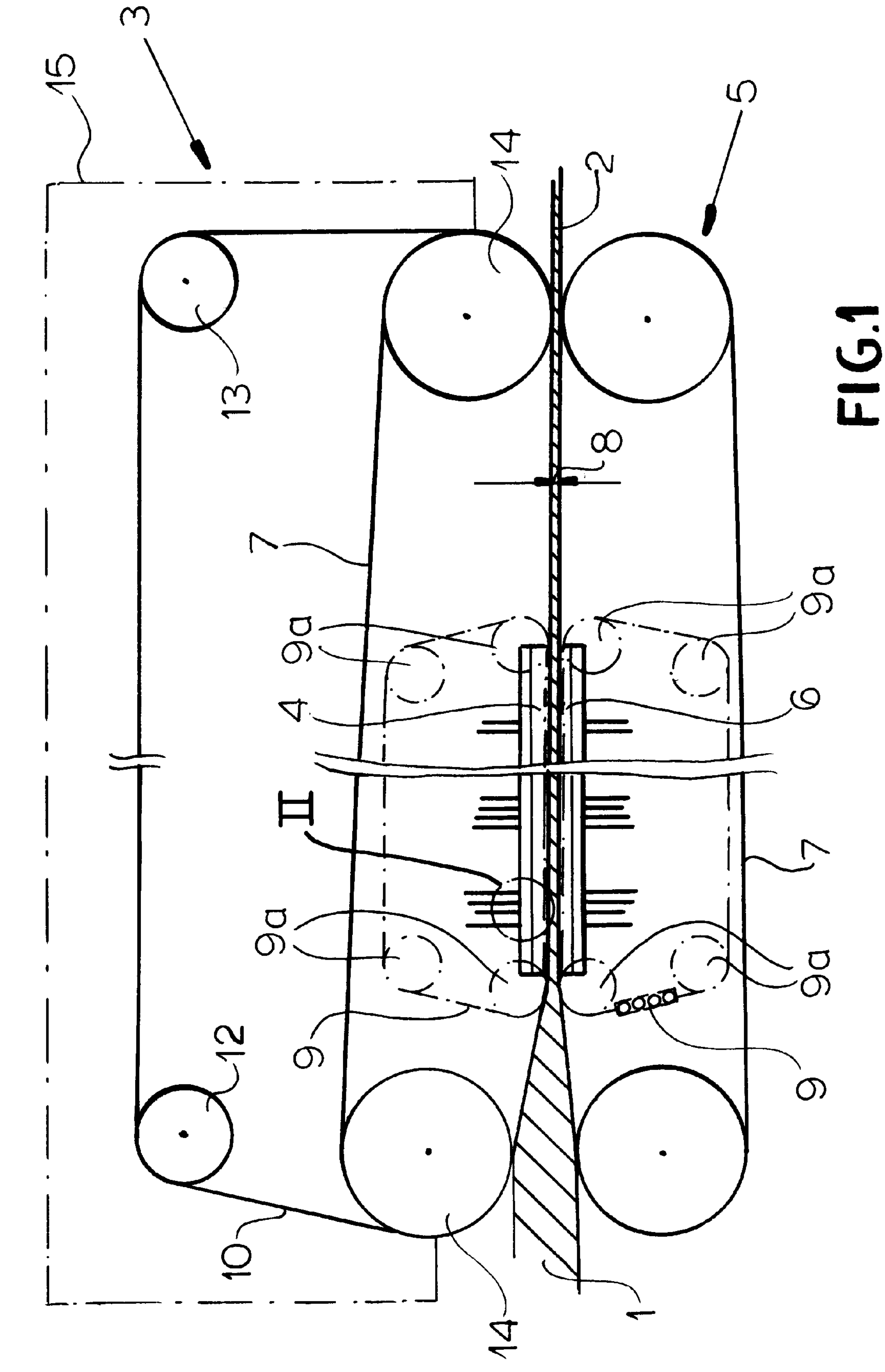
FIG. 1 is a diagrammatic lateral section of an apparatus for producing oriented strand pressed board from a wood-based mat according to the invention.

The apparatus; shown in the drawing is used for the pressing of a wood-based mat to boards of the material of the mat, using a continuous pressing operation of the apparatus. The wood-based mat 1 entering the press can be a mass of wood fibers or chips, preferably previously oriented, e.g. in the direction of displacement of the mat so as to produce oriented strand board (OSB) in a continuous manner. The mat may contain a thermosetting resin constituting a bonding agent, e.g. of the phenol formaldehyde or resorcinol type. Since the mat is both compressed and heated within the press, the press continuously produces a board product which can be transversely cut into boards and trimmed along the longitudinal edges of the continuous strand which is produced as may be desired or required.

The continuous press comprises an upper press part 3 with an upper heated press platen 4, forming the upper press member, and a lower portion 5 with a lower heated press platen 6. The press platens may be heated by the circulation of superheated steam through them or by electrical heating means.

Each of the press members 4 and 6 is juxtaposed with a respective endless driven steel-strip press belt 6 which form a press gap 8 between them in the pressing region which coincides with the region over which the upper and lower press platens 4 and 6 extend. The steel press belts 7 are guided around rollers which will be described further below. Between each steel belt 7 and the respective press platen 4, 6 is an endless set of circulating roller elements 9. The roller elements 9 can be connected together in a chain and serve to reduce friction between the respective press belts and platens while transferring a compression force from the press platens to the press belt and then to the mat in the gap 8 between the belts. The chain passing around the rollers *9a* in respective endless paths in the upper and lower portions of the press.

For the purpose of producing at least one structured surface on the boards 2 of the wood-based material as it emerges from the press for cutting up into discrete boards separate from the continuous strand, at least one of the steel press belts 7 is juxtaposed with a structuring belt 10 driven along a closed path and thus constituting an endless belt. At least where the structuring belt 10 engages the mat 1 and the board 2, the structuring belt moves synchronously with the respective steel press belt. In the embodiments which have been illustrated in FIGS. 1 and 5, the structuring belt is provided at the upper side of the mat and in the upper portion of the press.

Figure 4:
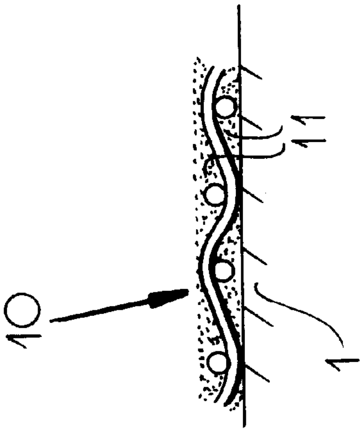
FIG. 4 is a view similar to FIG. 2 representing another embodiment of the structuring belt.
Figure 3:
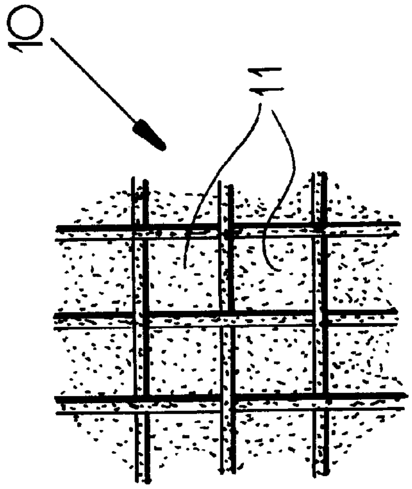
FIG. 3 is a plan view taken in the direction of arrow III of FIG. 2, showing the structuring belt.
Figure 2:
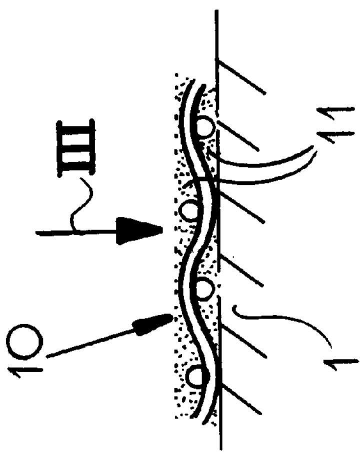
FIG. 2 is an enlarged detail of the region II of FIG. 1, also in highly diagrammatic form.

The structuring belt is preferably a screen composed of metal wire as shown in greater detail, for example, in FIGS. 2–4. The screen 10 has a mesh pattern which corresponds to the geometry of the structuring to be formed in the pressed board since the wire pattern is indented in the mat and the pressed board by the compression in the press and the resulting impression is stabilized by the heating which imparts the final thickness to the board and hardens the latter. The embossing pattern is thus a complement to the pattern of the wire mesh. The mesh openings of the screen 10 can contain a filler 11 which seals the screen against the passage of vapor, i.e. forms a hermetic seal. The filler 11, however, does not affect the patterning imparted to the board since the recesses and bulges of the wire remain at the side turned toward the board at least.

Preferably the wire forming the screen 10 is steel wire of substantially the same composition as the steel belt against which the screen lies so that both are subjected to the same degree of thermal compression and contraction. In the embodiment of FIG. 1 and in a preferred embodiment of the invention, the structuring belt 10 and the steel press belt 7 associated therewith and in the upper press part are guided over independent drive drums 12, 13 for the structuring belt and 14 for the endless steel press belts. The belts 7 are not perforated. The two belts can pass exclusively over the same rollers as has been represented by the rollers 14. The structuring belt 10 is under elastic tension.

FIG. 3 shows that the structuring belt has the pattern of a wire woven fabric. The pattern can, however, be that of a knit if desired.

The filling 11 sealing the openings of the structuring belt can be a temperature resistant plastic or a temperature resistant rubber which is vulcanized in place in the screen. The filler 11 can have an increased thermal conductivity by virtue of the incorporation therein of heat conductive material, for example, finely divided metal powder.

From FIG. 4 it will be apparent that the filler 11 of the structuring belt forms a smooth surface facing the upper steel press belt but retains the rough-like character of the screen on the side facing and contacting the wood-based mat.

Figure 5:
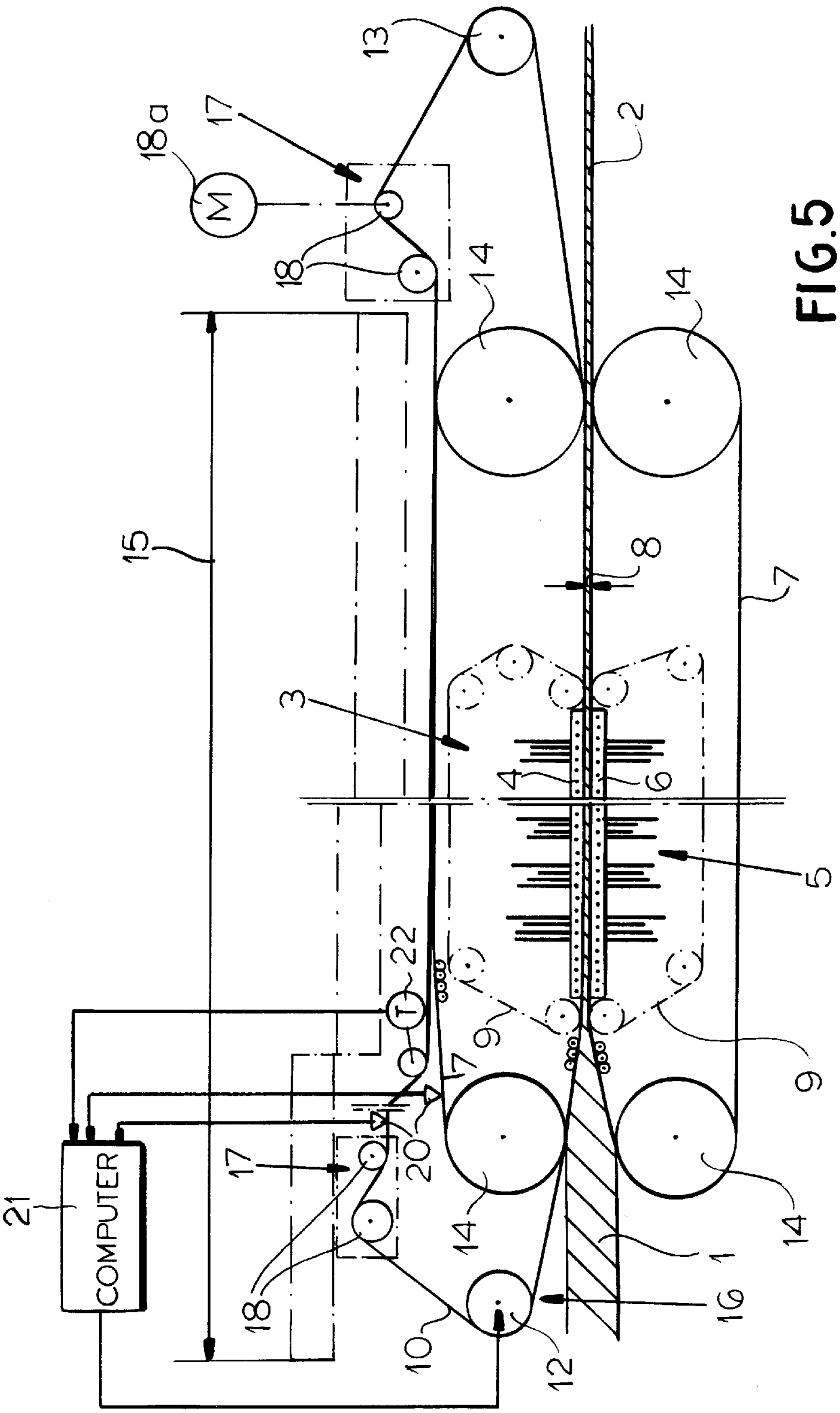
FIG. 5 is a view similar to FIG. 1 of another embodiment of the apparatus.
Figure 7:
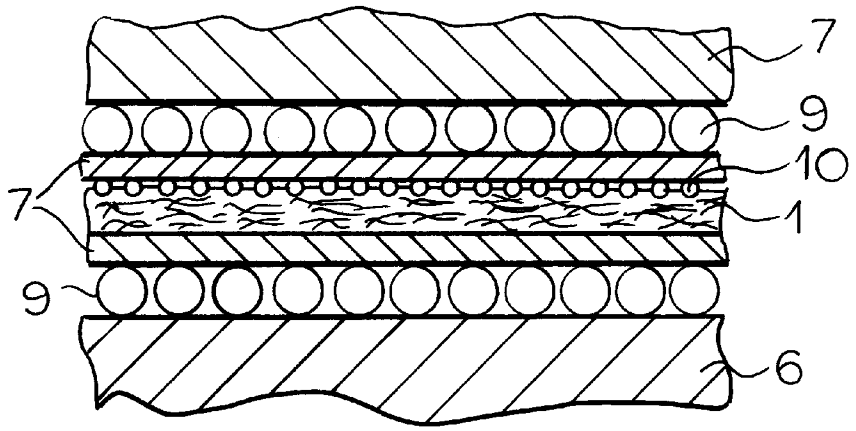
FIG. 7 is a detail view showing the relationship between the upper press; members, the steel belts, the structuring belt and the wood-based mat.
Figure 6:
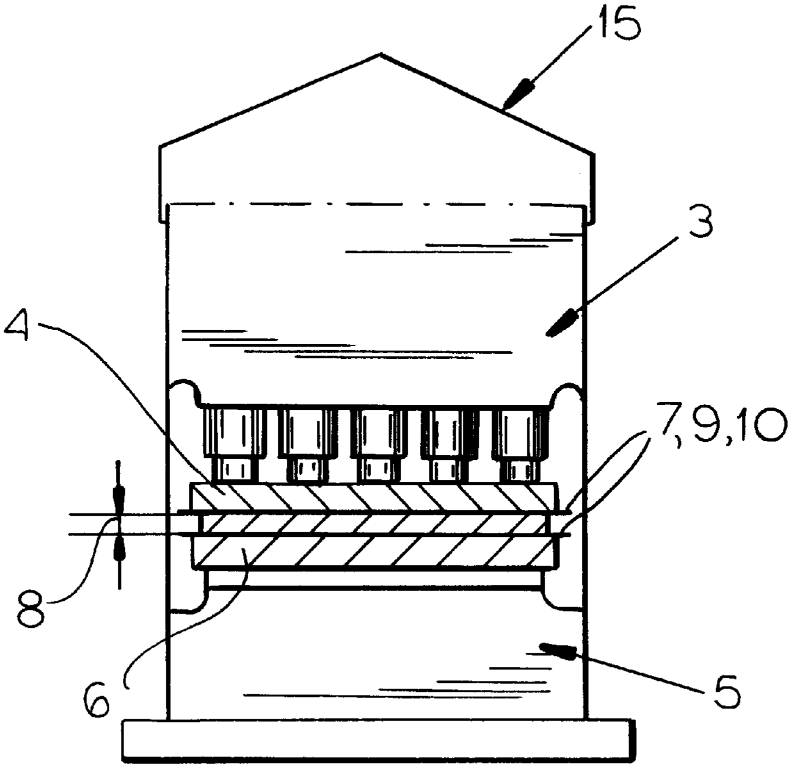
FIG. 6 is a transverse section through the press of FIG. 5, also in highly diagrammatic form.

The structuring belt 10 and the associated press belt 7 can pass in common, at least along their return stretches, through a tunnel 15 which has been illustrated in dot-dash lines in FIG. 1 and has been represented somewhat more diagrammatically in FIG. 5. The tunnel can be provided with heating devices such that both of the belts traversing the tunnel are brought to the same temperature.

The structuring belt 10, moreover, can be associated with a heating device at the upstream side of the press and this heating device can include at least one heating roller 12 which can form a direction change roller which simultaneously heats the belt.

In the embodiment of FIG. 5, moreover, two control stations 17 are provided for the structuring belt 10 and each can include one or more drums 18 for applying or maintaining tension on the belt 10 and position so that a substantial part of the periphery of each of these rollers is in frictional contact with the belt. One or more of the rollers or drums 18 may be provided with a controllable electric motor and shown, for example, at 18*a*, so that, by control of such motors, both the speed and the tension on the belt 10 can be varied and adjusted. The stations 17 are preferably provided at direction change locations upstream and downstream of the return stretch of the belt. Of course only one control station 17 can be used if desired.

Where a tunnel is employed as shown at 15 in FIG. 5, for example, the return stretches of the structuring belt 10 and the associated steel belt 7 can press against one another so that these belts lie against one another in the tunnel and are identically heated. Here too they are preferably composed of the same material, namely, a corrosion resistant or stainless steel. Of course the two belts in the upper part of the press can have respective sensors 20 providing inputs to a computer 21 which can control the heating, e.g. via the heating roller 12. A tachometer 22 can provide an input to the computer 21 as a measure of the speed of the structuring belt 10 so that the computer can maintain a predetermined temperature difference, optionally as a function of belt speed, between the belt 7 and 10 in the upper part of the press.

We claim:

1. An apparatus for continuously producing pressed board from a wood-based mat, comprising:
   - a press having a heated upper press member and a heated lower press member defining between them a gap through which said wood-based mat passes continuously and in which said wood-based mat is compressed and heated to form a pressed board;
   - an upper endless steel press belt and a lower endless steel press belt respectively guided along said upper and lower members to receive said wood-based mat between said upper and lower press belts and compress said wood-based mat between said belts;
   - upper and lower sets of rollers respectively circulating along upper and lower paths extending between said upper endless steel press belt and said upper member and between said lower endless steel press belt and said lower member; and
   - at least one endless structuring belt displaceable along a closed path extending between a respective one of said endless steel belts and said wood-based mat and moving synchronously with said one of said endless steel belts, said structuring belt being composed of wire in a screen pattern impressed in said board and forming a structuring thereof, said structuring belt being a screen having openings hermetically sealed by a filler.

2. The apparatus defined in claim 1 wherein said screen pattern is a weave pattern.

3. The apparatus defined in claim 1 wherein said screen pattern is a mesh pattern.

4. The apparatus defined in claim 1 wherein said one of said endless steel belts and said structuring belt are composed of substantially the same material and have return stretches upstream and downstream of a pressing region passing through a common heating tunnel.

5. The apparatus defined in claim 1 wherein said structuring belt passes through a heating unit upstream of a pressing region of said press.

6. The apparatus defined in claim 5 wherein said heating unit comprises at least one heated roller engaging said structuring belt.

7. The apparatus defined in claim 1, further comprising respective temperature-measuring devices for measuring temperatures of said one of said steel belts and said structuring belt, a computer connected to said devices, and means controlled by said computer for controlling temperatures of said one of said steel belts and said structuring belt to maintain a predetermined temperature difference between said one of said steel belts and said structuring belt.

8. The apparatus defined in claim 1, further comprising at least one belt control station with at least one belt-tensioning drum and a controllable drive motor along said closed path of said structuring belt at a direction-changing portion thereof.

9. The apparatus defined in claim 4 wherein said tunnel includes guide means for said one of said endless steel belts and said structuring belt forcing said structuring belt into contact with said one of said endless steel belts.

10.The apparatus defined in claim 1 wherein said structuring belt is a screen having a planar side turned toward said one of said endless steel belts and a trough-forming side turned toward said wood-based mat.

11. The apparatus defined in claim 1 wherein said structuring belt and said one of said endless steel belts are guided over respective independent direction-changing drums.

12. The apparatus defined in claim 1 wherein said structuring belt and said one of said endless steel belts are guided over the same direction-changing drum.

13. The apparatus defined in claim 1 wherein said structuring belt is provided under elastic pretension.

14. The apparatus defined in claim 1 wherein said structuring belt is a wire knit fabric.

15. The apparatus defined in claim 1 wherein said filler is a temperature-resistant plastic.

16. The apparatus defined in claim 1 wherein said filler is a temperature-resistant rubber mixture vulcanized in openings of the screen pattern of said structuring belt.

17. The apparatus defined in claim 1 wherein said filler contains a finely divided thermally conductive material distributed therein.

18. The apparatus defined in claim 17 wherein said material is a metal powder.

* * * * *